United States Patent [19]

Maus et al.

[11] Patent Number: 5,068,065

[45] Date of Patent: Nov. 26, 1991

[54] FASTER CYCLING SPRUE METHOD AND APPARATUS FOR INJECTION MOLDING PLASTIC OPTICAL DISKS

[75] Inventors: Steven M. Maus, Osseo; George J. Galic, Columbia Heights, both of Minn.

[73] Assignee: Galic Maus Ventures, Columbia Heights, Minn.

[21] Appl. No.: 563,659

[22] Filed: Jul. 31, 1990

[51] Int. Cl.$^5$ ............... B29C 45/27; B29C 45/38; B29D 17/00

[52] U.S. Cl. ............... 264/1.3; 264/106; 264/161; 264/328.7; 264/328.11; 264/328.14; 264/334; 425/547; 425/548; 425/549; 425/554; 425/565; 425/568; 425/577

[58] Field of Search ............ 264/2.2, 106, 107, 328.1, 264/328.7, 328.9, 328.11, 328.14, 328.15, 334, 161, 1.3; 425/547, 548, 549, 553, 554, 556, 564, 565, 566, 568, 571, 577

[56] References Cited

U.S. PATENT DOCUMENTS

| | | | |
|---|---|---|---|
| 2,306,316 | 12/1942 | Marsh | 425/547 |
| 3,776,676 | 12/1974 | Kessler | 264/328.14 |
| 4,069,003 | 1/1978 | Cecchi | 425/568 |
| 4,085,178 | 4/1978 | McNeely et al. | 425/810 |
| 4,185,955 | 1/1980 | Holmes et al. | 425/810 |
| 4,260,360 | 4/1981 | Holmes | 425/548 |
| 4,306,852 | 12/1981 | Mateev et al. | 264/328.15 |
| 4,374,636 | 2/1983 | Holmes | 425/589 |
| 4,409,169 | 10/1983 | Bartholdsten | 264/107 |
| 4,412,805 | 11/1983 | Morrison | 425/549 |
| 4,519,763 | 5/1985 | Matsuda | 425/192 |
| 4,627,809 | 12/1986 | Okabayashi | 425/555 |
| 4,666,396 | 5/1987 | Shaw | 425/549 |
| 4,707,321 | 11/1987 | Segawa | 264/294 |
| 4,738,613 | 4/1988 | Eichlseder | 425/556 |
| 4,772,196 | 9/1988 | Asai | 425/155 |
| 4,790,738 | 12/1988 | Shimojo | 425/192 |
| 4,793,953 | 12/1988 | Maus | 264/219 |
| 4,820,467 | 4/1989 | Ehrler | 264/161 |
| 4,828,769 | 5/1989 | Maus et al. | 264/1.3 |
| 4,880,587 | 11/1989 | Eichlseder | 264/154 |
| 4,900,242 | 2/1990 | Maus et al. | 425/150 |
| 4,965,028 | 10/1990 | Maus et al. | 264/328.15 |
| 4,981,634 | 1/1991 | Maus et al. | 264/102 |

FOREIGN PATENT DOCUMENTS

| | | |
|---|---|---|
| 0128722 | 12/1984 | European Pat. Off. . |
| 0177991 | 4/1986 | European Pat. Off. . |
| 0210475 | 2/1987 | European Pat. Off. . |
| 0230695 | 8/1987 | European Pat. Off. . |

*Primary Examiner*—Jan H. Silbaugh
*Assistant Examiner*—Brian J. Eastley

[57] ABSTRACT

Optimum sprue design requires suitably large cross-sectional area of the open aperture during mold filling and packing yet fast heat removal from the molten sprue during solidification. This is accomplished by a "hollow" sprue configuration, wherein an enlarged female sprue bushing cavity of large draft angles is axially aligned with a "spreader die" type of male member having a generally conical-tipped or parabolic-tipped torpedo shape, creating a cross-sectional open aperture consisting of an annular ring along at least partway up from the base to the tip. Both male and female may be fitted with internal mass-transport cooling. Since the cooling time of the sprue is directly proportional to the wall thickness of the molten plastic sprue being formed, and cooling time is further inversely proportional to the plastic/mold surface area, the resulting "hollow sprue" provides superior cooling without impaired fill and pack function. Further gains are made by varying the relative axial distance of the male and female sprue bushing members within each molding cycle. Before molten plastic injection is started, the male and female members of the sprue bushing assembly are axially coaligned but in a first position of relatively large separation distance. After plastic flow into the disk moldset is done, the male and female members may be urged together to a second position with a smaller separation distance.

31 Claims, 6 Drawing Sheets

FASTER CYCLING SPRUE METHOD AND APPARATUS FOR INJECTION MOLDING PLASTIC OPTICAL DISKS

FIELD OF THE INVENTION

This invention relates to an improved method and apparatus for faster injection molding of plastic optical disks. More specifically, shorter molding cycles and correspondingly higher output can be obtained by improved cooling of the novel sprue. New configurations and processes are shown for improved sprue filling and cooling functions.

BACKGROUND

The field of injection molded thermoplastic optical disks includes all products using laser-read digital and/or analog encoded information stored on such molded disks. For example only, such disks can be as large as 300 mm diameter video disks recorded with a feature length movie, or as small as a 89 mm magneto optical erasable memory disk for computer storage of several hundred megabytes of data. However, the most popular is the 120 mm size digital audio compact disk for music, of which current worldwide production exceeds 400,000,000 CD per year. Drastic improvements in productivity have been made in the past 3-4 years, with molding cycles of 12-15 seconds being now dropped to about half that, with corresponding increases in throughput. However, further improvements are both desirable and necessary.

The molding cycle time can be broken down into the following stages:
1. Fill and pack
2. Cooling until solidified
3. Removal of solidified disk from the moldset In analyzing the constituent parts of CD molding cycle time, steps #1 plus #2 would equal the "mold closed" time and step #3 is the "mold open" time. Possible improvements in any one of these steps may reduce total cycle time; for example, Applicants' Ser. No. 07/355,754 filed May 22, 1989, now U.S. Pat. No. 4,918,634, issued Jan. 1, 1991, teaches a faster, cleaner, and simpler way to remove the molded disk from the moldset, thus reducing "mold open" cycle time.

However, in the current CD molding process state of art, fill and pack typically take only a half second and disk removal time is less than 2 seconds, so about two-thirds or more of the total cycle time is due to cooling of the molten plastic in the molded disk and its sprue. Applicants' U.S. Pat. No. 4,793,953 teaches a way to improve heat transfer and shorten cooling time of the molded disk itself between two optically polished part forming surfaces of the disk moldset. However, the cooling time of the disk itself may actually be shorter than the required minimum cooling time of the sprue, in which case the sprue's cooling time dictates the minimum total cycle time of the molding operation. Improvements in this sprue cooling, therefore, are extremely desirable, since it appears to be the "bottleneck function" in the current state of arts. It is the subject of the present invention.

The purpose of the sprue in an optical disk moldset is to provide a passageway for the injected molten thermoplastic to travel from the nozzle tip of the injection molding machine into the disk mold cavity itself. The sprue must therefore provide a desirably large aperture through which the melt will flow with minimum impedance during fill (constrictiveness in this stage will result in slower filling time and both cosmetic and molded-in stress problems in the resulting molded disk). This sprue aperture size also determines the amount of pressure drop incurred between the nozzle tip and the gate into the disk mold cavity itself (too high a pressure drop during the pack stage can give inadequate packing to the melt in the disk mold cavity, resulting in poor surface replacation and bad signal quality of the molded disk). On the other hand, if the sprue aperture is sized very generously to minimize fill and pack problems, then the cooling time required for the sprue's molten plastic to sufficiently solidify to permit its ejection during mold open becomes very long. All known optical disk molds currently use a sprue geometry which is a section cut from a steeply tapered conical solid. (See FIG. 2). Therefore, with this conventional state of arts, there is a direct tradeoff between having the smallest possible sprue for shortest cooling time yet having the largest possible sprue for best product quality and fastest fill and easiest packing.

PRIOR ART

Looking now at the relevant prior art patents concerning optical disk injection molding, these prior art patents and literature showing sprues for optical disks show the "cold sprue" tapered conical solid type just described, and therefore have those inherent tradeoffs and limitations. More specifically to audio CD molding, about three-quarters of all the world's CD molds are designed and made by four companies. A look at example patents owned by each shows sprues of the type just described in each:

1. Meiki (U.S. Pat. No. 4,772,196; U.S. Pat. No. 4,790,738)

2. Krauss Maffei (U.S. Pat. Nos. 4,738,613; 4,820,467; 4,880,587; EPO 0 210 475)

3. Nagron BV (EPO 0 177 991; EPO 0 230 695)

4. Sony (U.S. Pat. No. 4,707,321)

In addition, note is taken of other miscellaneous patents in optical disk molding, including U.S. Pat. Nos. 4,260,360 and 4,374,636 (to DiscoVision); EPO 0 128 722 (to Technoplas); U.S. Pat. Nos. 4,519,763 (to Matshushita and Nissei) 4,409,169 (to Polygram); 4,627,809 (to Daicel).

An alternative to the above state of the arts would be to employ a heated sprue bushing of the type well known to the art, wherein the injected plastic is maintained to the temperature above solidification. The earliest optical disk molds of 6-8 years ago employed such hot sprues but none of the molds built in the last few years have used them. The reason is that the heated sprue bushing must necessarily be maintained at a temperature high above the plastic's solidification temperature to keep the molten plastic therein at a desirably low viscosity for injection fill. This high heat in close proximity to the disk mold cavity necessarily retards the cooling of the disk surfaces and thus the total cooling time is greater than if a "cold sprue" (one which is cooled and removed on each molding cycle) is used. Morrison (U.S. Pat. No. 4,412,805 issued Nov. 1, 1983) is an example of optical disk molds using hot sprues, and a non-optical-disk-mold example (Shaw, U.S. Pat. No. 4,666,396 issued May 19, 1987) discussed the problem of trying to thermally isolate the heated sprue from the rest of the mold.

SUMMARY OF INVENTION

The present invention improves sprue cooling without impeding mold filling and packing functions necessary for good optical disk molded product performance and cosmetic appearance. To provide suitable filling and packing, the melt passageway between the nozzle tip and the disk mold cavity must be of an open aperture of suitably large cross-sectional area—at least greater than or equal to the cross-sectional area of a conventional cold sprue disk mold design at a comparable position along its length—during the time that the molten plastic is flowing into the mold cavity. That is why merely making a smaller ID conventional sprue won't work; they're already as small as can be without poor disks being made.

In one embodiment of the present invention, a novel configuration of the sprue bushing within an optical disk moldset is used to provide suitably large cross-sectional area of the open aperture yet has a substantially greater cooling surface area, for faster heat removal from the molten sprue toward solidification. This is accomplished by a "hollow" sprue configuration, formed between the opposing pair of male and female members wherein at least a substantial percentage of the female member's length is enlarged into a female sprue bushing cavity of sufficiently large draft angles to mate with and co-axially align with a substantially protruding tip of a "spreader die" type of male member having a shape like the leading or front portions of a generally conical-tipped or parabolic-tipped torpedo shape. In a first position of the disk moldset when injection fill is started, the opposing male and female members are separated by a separation distance in the sprue's hollow portion which forms an annular-shaped open aperture to incoming melt, with the cross-sectional area of the annular aperture being larger than the corresponding aperture of the conventional conically-shaped solid sprue.

When the female and male members of this novel sprue bushing assembly are being injected with the thermoplastic melt, the passageway thus formed may start at the nozzle tip (at the upstream end) in a conventional tapered conical form but then transitions into a cross-sectional open aperture consisting of an annular slice or ring at least just before the sprue bushing joins the generally perpendicular plane of the mold cavity (at the downstream end) wherein the molded disk is to be formed. Since the filling and packing function is directly proportional to the cross-sectional area of the open aperture of the sprue's melt passageway, and since the cooling time of the sprue is directly proportional to the wall thickness of the molten plastic sprue being formed, and cooling time is further inversely proportional to the plastic/mold surface area (for any given "Delta T" temperature differential of mold temperature to melt temperature), the resulting novel configuration provides superior cooling without impaired fill and pack function.

Another embodiment of the present invention employs this novel configuration of sprue bushing further improves the tradeoff between "fill and pack" functions and cooling functions by a method step of varying the relative axial distance of the male and female sprue bushing members within each molding cycle. Specifically, before molten plastic injection is started, the male and female members of the sprue bushing assembly are co-axially aligned but in a first position of relatively large separation distance. After fill and pack have been completed and/or plastic flow is no longer desirable, this first position of male and female member is controllably changed by urging together the male and female members to a second position having a smaller separation distance therebetween. This substantially axial motion can be driven in a number of ways but a preferred embodiment is to move forward the male member until the second position is reached. Such motion can be driven by means internal to the moldset (i.e. a hydraulic or pneumatic cylinder) or alternatively the male member may be mechanically linked to injection molding machine functions such as the ejector or core-motion systems of the machine.

A further embodiment of the present invention would combine the novel hollow sprue configuration and sprue bushing assembly with the variable aperture size of an axially controllably moving assembly from a first to a second position in the molding cycle, wherein this motion is driven by the compression stroke of an injection-compression molding process sequence. In this case, the separation distances of the male and female sprue bushing members is concurrently being reduced while the separation between opposing partforming surfaces of the disk mold cavity itself is also being reduced. Most preferably, both are being commonly driven by mechanical linkage to the compression stroke of the injection compression molding process sequence. This combination can not only increase cross-sectional open aperture of the sprue during fill but also do the same in the disk mold cavity itself.

Additional embodiments show the present invention sprue configuration and function can be combined with ways to separate the sprue from the disk before the mold is opened (an automatic "self-degating" function which is a highly desirable way of forming the center hole in the optical disk). Variations of this combination can also be used as a mechanical shutoff gate between the sprue and the disk mold cavity to work like a valve gate.

Other embodiments combine the present invention sprue configuration and function with a way to seal off the nozzle tip of the injection molding machine after desired plastic flow is complete, thus allowing the molding machine to start sprue plastication, without waiting for complete solidification of molten plastic in the gate and tip areas.

DETAILED DESCRIPTION OF THE INVENTION

Figure 1A:
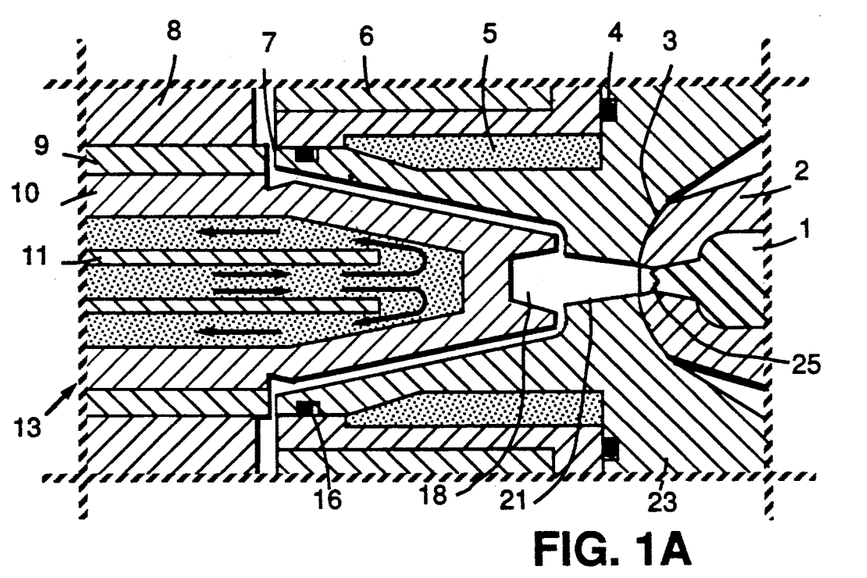
FIGS. 1A–1D are partial axial cross-section views of the optical disk moldset, shown in 4 stages within the injection molding cycle sequence.

FIG. 1A shows Applicants' optical disk mold in partial axial cross-section enlarged to show details of this novel sprue bushing assembly and its workings. At the right hand side, the injection molding machine's nozzle tip (2) is shown in contact against the disk moldset's sprue bushing assembly (24), and radius of curvature (3) of the male nozzle tip and the female member (23) is conventionally substantially equal so as to assure proper seal and proper co-axial alignment of the melt passageways of the moldset and nozzle.

Note that the sprue bushing assembly is comprised generally of a male member (10) and female member (23), each of which itself may be either monolithic or a subassembly. In a typical example such as shown in FIG. 1 (but not restricted thereto), the female member would be mounted inside the stationary half of the disk moldset, and the stationary half in turn is mounted onto the fixed platen (not shown) of the injection molding machine. Likewise, the male member would be mounted inside the movable half of the disk moldset, and the movable half in turn is mounted onto the movable platen (not shown) of the injection molding machine. Optionally but preferably, each member must contain provisions for rapid removal of heat, most preferrably of the mass transport type, to provide optimum sprue cooling conditions. Accordingly, female member (23) is shown fitted internally with an annular passageway (5), within which circulating liquid coolant is conventionally supplied under pressure and temperature control, for optimal heat transfer. This coolant passageway encircling the sprue itself is shown with o-ring seals (4), (16) but soldering and other mechanical joining means are functional equivalents well known to the art. Sprue bushing male member (10) is likewise shown fitted with an internal circulating coolant passageway, shown here as a conventional bubbler tube assembly, with a flow pattern of coolant liquid (12) rising along the center line within a concentric tube (11) which act as a flow baffle, then returning along the outside of the baffle. Use of liquid coolant is shown throughout FIGS. 1-4 drawings of the present invention but alternative heat removal means such as "heat pipes" employing liquid/vapor phase change mechanism within a sealed tube is equivilant and well known to the art (one commercial source is Kona Corp., Gloucester, Mass. Since a claimed major advantage of the present invention is to cool the sprue from within a hollow portion rising from its base, with the sprue's inside surface being in intimate thermal contact with the male member's spreader die shape protruding tip, at least the male member (and optionally but also preferrably both members) must contain suitable means for mass transport cooling, such that the male member may be maintained at a temperature below the solidification temperature of the plastic.

Male (10) and female (23) members of the sprue bushing assembly (24) are co-axially aligned in a first position shown in FIG. 1A, wherein a separation distance between male member (10) and female member (23) is established, before injection fill is started. The male and female sprue bushing assembly thus described is also capable of controllable axial travel, most specifically motion back and forth by at least one member relative to the other. Such motion can be conventionally supplied by mechanical tie-in of the moving member to the injection molding machine's ejector or core functions, by means well known to those skilled in the art, or alternatively independently driven by springs or hydraulic or pneumatic cylinders mounted within the moldset itself, without cooperation by the injection molding machine. Any such means may be chosen, so as to controllably increase or decrease the separation distance of the male and female members and, in specific, to be able to travel from a first position of greater separation distance to a second position of lesser separation distance on each molding cycle, at a time when injection of thermoplastic melt has been substantially completed and it's desired that no more flow can get through the passageway provided by the sprue bushing assembly.

An optional stripper ring sleeve (9) is fitted circumferentially around male member (10), and it is capable of axial travel back and forth, relative to male member (10). Its motions can be controllably driven by similar means just described.

The optical disk moldset's mold cavity itself is defined by opposing partforming surfaces (6) and (8) on the stationary and movable halves of the moldset. An electroformed nickel stamper (not shown) carrying encoded information may be conventionally fitted and retained on either stationary or movable side of the disk mold cavity, as is well known to the art. Mold venting (not shown) could be optionally added through small passageways into and out of the mold cavity itself, to provide for vacuum assisted mold venting before filling or alternatively for use of compressed air to assist molded disk to be transferred and/or ejected from its partforming surfaces, by means well known to the art.

FIG. 1A shows the optical disk moldset in its first position, before the molten thermoplastic (1) within the nozzle tip is injected into the mold.

Figure 1B:
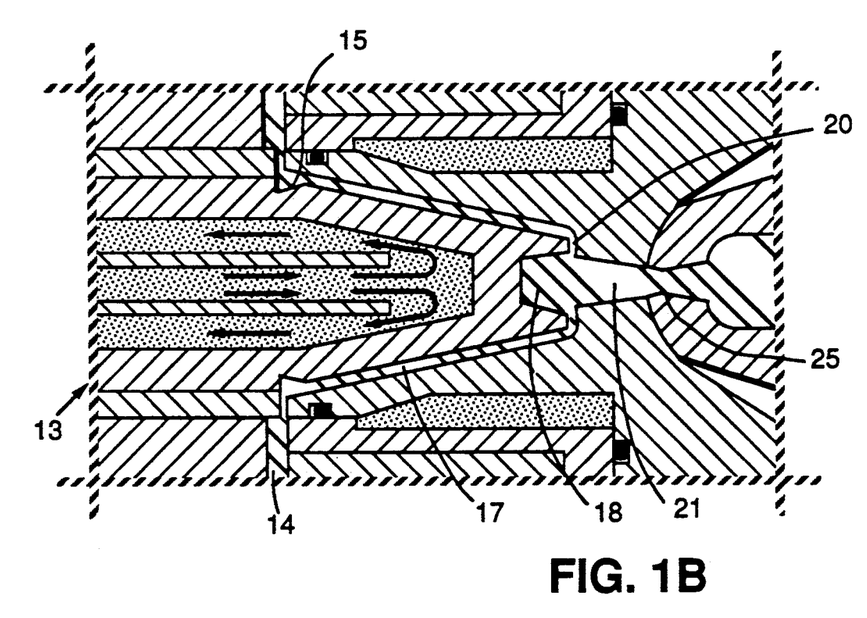

FIG. 1B shows the same moldset in the same first position after the melt has been injected and the cavity (14) has been filled. Note coldwell (18) is axially aligned with the initial flow of melt from the nozzle so as to trap any possible "cold slugs" which may have occurred during the intermittent operation of the molding cycle. Also note that an annular constrictive land (20) will help purify the incoming melt by straining out any large "unmelt" particles (incompletely melted thermoplastic resin pellets) as well as "cold slugs" (partially solidified or "skinned" melt cooled at the nozzle tip after injection is done). Also, optionally the wall thickness of the hollow sprue may advantageously the progressively increased along its length from the upstream to downstream end.

Figure 1C:
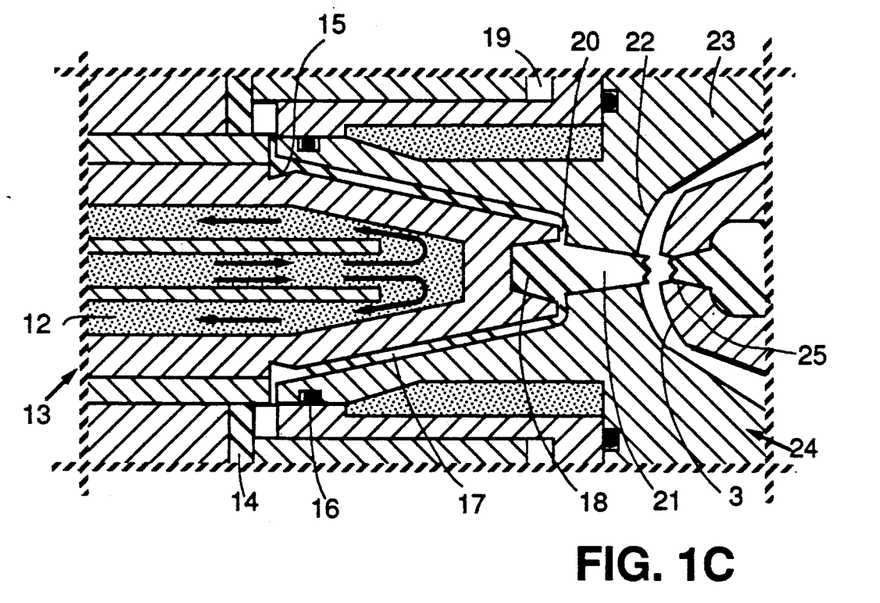

FIG. 1C now shows the moldset after the plastic has solidified and the centerhole has been punched in the disk by an axial travel of both male and female members of the sprue bushing assembly forward, toward the nozzle. This motion is made possible by the retraction of the nozzle. The distance of the axial travel is shown in the gap (19). In this case, the motion was by the forward travel of the male member (10) relative to the gate and the disk mold cavity. (To minimized "cold slug" formation, once desired plastic flow into the moldset is done, the nozzle tip has been retracted away from thermal contact with the cooler mold by means of the "sprue break" feature of the injection molding machine, a machine option to move the injection carriage back and forth well known to the art). This motion then causes the sprue (21) to tear off at its thinnest point (25).

Note the separation distance of the male and female members has NOT been reduced. The annular cross-sectional area of the melt passageway formed between the male and female members has remained unchanged, in this embodiment (other options will be shown in FIGS. 3A-C). Note also that original gate (7) between the sprue and disk mold cavity has now also been shut by this axial travel after the plastic is solidified, thus punching the centerhole of the resulting molded disk.

Figure 1D:
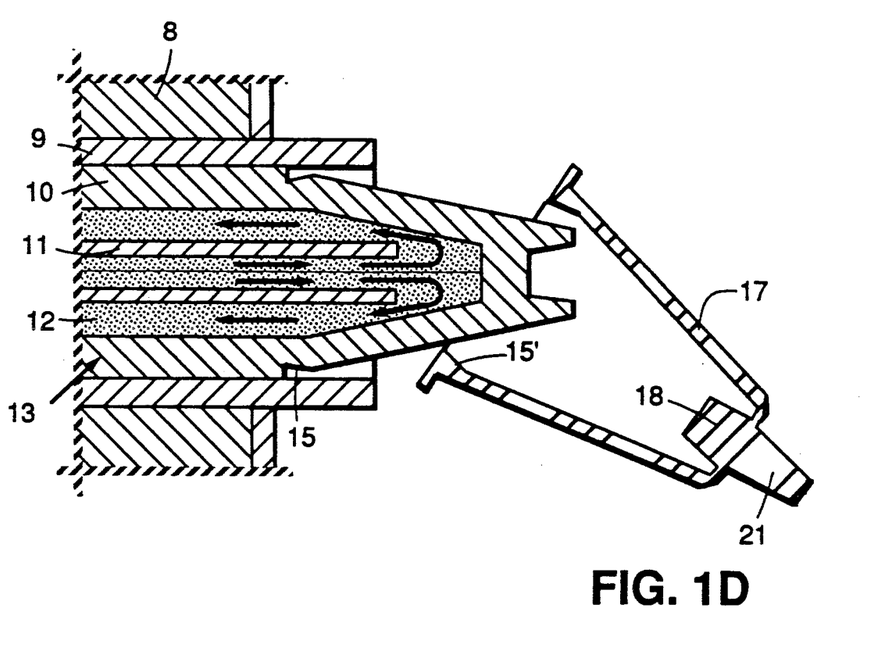

FIG. 1D shows a later stage in the injection molding cycle wherein solidification and separation of sprue from disk of FIG. 1C is completed and both are now being ejected from the mold. Note that a forward motion of stripper sleeve (9) relative to male member (10) will provide driving force for positive removal of the molded solidified sprue (17). Note also that, were an additional concentric sleeve (not shown) to be placed on the outer circumference of stripping sleeve (9), that outer sleeve could act as a similar stripping ring, and it could assist the molded disk (14) to be removed from its partforming surface (8) on the movable half. (Conventionally, both sprue and molded disk are retained by means of appropriate undercut and/or vacuum assistance during mold opening to transfer and be retained on the movable half of the moldset, but this is not a necessary limitation to the present invention.) Note also that an optional deliberate undercut (15) on the male member has been made, to assure retention of the sprue onto the male member (on the movable half of the moldset) while the moldset first opens, thus positively transferring it off of the female member. Note at the end of coldwell (18) there may be an additional undercut (29) or negative draft angle, so as to further help "pull the sprue" out of the female member while the moldset is opening.

After the molded disk and sprue have been ejected during the mold opening phase of the cycle, the moldset again closes to its first position as shown in FIG. 1A and is again ready for injection to start a new cycle.

Note that without optional step of FIG. 1C, the present invention still has substantial advantages in faster cooling versus a conventional optical disk mold sprue of a solid type. For example, all audio compact disks ("CD's") have, by international standard, a 15 mm ID centerhole, thus defining the molded disk after it has been separated from its sprue.

Now see FIG. 2. All known CD molds presently in production use a sprue design of the type shown in FIGS. 2A, 2A-AA and 2A-BB (labelled "Comparative Example; Conventional Sprue of Prior Art"). This molded sprue (40) is geometrically defined by the configuration of the melt passageway followed by the thermoplastic as it is injected from the nozzle tip through the sprue bushing assembly, through the circumferential gate (7) and into the disk mold cavity. At the nozzle tip (furthest upstream part of the molded sprue), the injected melt typically flows substantially axially until it reaches the plane of the disk mold cavity, at which point it makes a substantially perpendicular ninety degree turn and is spread substantially radially (preferrably in 360 degrees symmetry) as the melt travels outward until it passes through the gate and into the disk cavity. Note that after the sprue (40) is separated from the centerhole, the OD (48) of this annular flange (46) must also substantially equal 15 mm for a CD. This general sprue configuration (40) of the prior art type provides for a family of specific configurations. Each, however, will have an upstream tip (41) which will have a cross-sectional tip diameter (42) and corresponding circular cross-sectional area (FIG. 2A-AA), a length (44) from tip to base downstream, having a base diameter (43) and corresponding circular cross-sectional area (FIG. 2B-BB) at the base, with the base being joined to a flange (46) terminated at the gate area ((7) of FIG. 1) of the disk mold cavity. A draft angle (47) relates the relative difference between tip and base diameter. The greater the draft angle, the less problems in sprue sticking during ejection and removal stages phases, as is well known to the art.

Looking now at some leading commercial CD molds in current use, the following Table 1 shows how they compare with respect to these varying sprue design parameters. (See Table 1). Comparison between these three most popular molds shows substantial differences in their respective open apertures during filling (proportional to the cross-sectional areas of their diameters from tip to base) and also in the relative degree of constrictiveness of each design. (For example, if 2 sprues have the same tip and base diameters but one has greater length, it would be relatively more constrictive. However, greater length from tip to base is thermodynamically preferred, since the disk is better isolated thermally from the source of the heat—by having the molding machine nozzle tip further away from the disk cavity, better disk cooling results.) So, there are again tradeoffs between optimal cooling cycle time and melt filling in the prior art.

TABLE 1

| Sprue Design | Comparative Brands of CD Molds | | |
|---|---|---|---|
| Parameter | Meiki | Nagron | KraussMaffei |
| Tip O.D. (42) | 2.5 mm | 2.5 mm | 2.3 mm |
| Base O.D. (43) | 5.0 | 3.5 | 3.2 |
| Length (44) | 68 | 53 | 25 |
| Flange O.D. (48) | 15 | 15 | 15 |

Figure 2A:
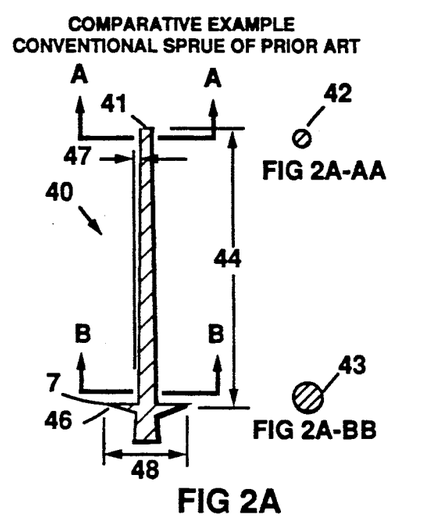
FIGS. 2A, 2A-AA, 2A-BB, 2B, 2B-AA, 2B-BB, 2B-CC, 2C, and 2D show cross-sectional lengthwise and cross-sectional "slice" views comparing configurations of a conventional CD molded sprue (of the prior art) to certain embodiments of the present invention sprue.
Figure 2B:
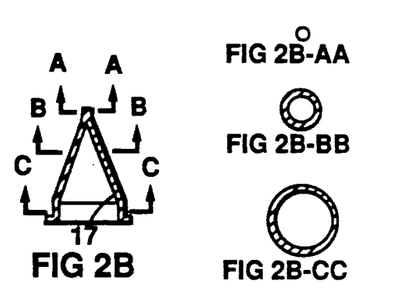

FIG. 2B and 2B-AA and 2B-BB and 2B-CC show the present invention does not employ a substantially flat flange or base at the plane of the disk mold cavity and gate circumference. Rather than the simple geometries of these conventional sprues, Applicants deliberately changed to a "hollow" sprue shown in lengthwise cross-section in FIG. 2B. Note specifically that (in FIGS. 1, 3 and 4) the configuration of the male member of the sprue bushing assembly is changed from the conventional flat (of the prior art) to a convex form, preferably symetrical about an axis of rotation 360 degrees for uniform filling, cooling and wall thickness of the resulting hollow sprue. This male member geometry is typically of a "spreader die" type of male member of the leading or front portions of a generally conical-tipped or parabolic-tipped torpedo shape. It mates with the female member's sprue bushing cavity of sufficiently large draft angles to house the protruding tip of the male. Together they provide a hollow sprue which serves as a melt passageway with equal or greater cross-sectional area of the open aperture (see FIGS. 2B-BB & 2B-CC) than conventional solid sprues, yet has a far greater cooling surface area and thinner wall thickness, for faster heat removal from the molten sprue during solidification.

There are many possible variations on the basic "hollow sprue" configuration, besides as shown in FIG. 2B. Another "hollow sprue" configuration is shown in lengthwise cross-section in FIG. 2C, having a solid tip and a hollow base. Yet another "hollow sprue" configuration is shown in lengthwise cross-section in FIG. 2D, having a hollow tip and a hollow base. Neither need the cylindrical sidewall of FIGS. 2B, 2B-CC.

When the female and male members of this sprue bushing assembly are being injected with the thermoplastic melt, the passageway thus formed may start at the nozzle tip in a conventional tapered conical form of conventional cross-section but then transitions into a cross-sectional open aperture consisting of an annular slice or ring at least just before the sprue bushing joins the generally perpendicular plane of the mold cavity wherein the molded disk is to be formed. Since the filling and packing function is directly proportional to the cross-sectional area of the open aperture of the sprue's melt passageway, and since the cooling time of the sprue is directly proportional to the wall thickness of the molten plastic sprue being formed, and cooling time is further inversely proportional to the plastic/mold surface area (for any given "Delta T" temperature differential of mold temperature to melt temperature), the resulting novel configuration provides superior cooling without impaired fill and pack function. Such a "hollow sprue" having both inside and outside surfaces, its geometry progressively increases also the amount of surface contact area between the molten thermoplastic within the sprue and the male and female members, for maximum heat transfer rates. These inside and outside surface contact areas should, when summed together, substantially exceed the contact area of a solid conical sprue of equal length of the prior art.

In general, the more that the male member protrudes into the female member cavity after injection flow has stopped, the more "hollow" the sprue will be and the greater the benefit in improved cooling. When the moldset is in its final (second) position, it is believed that the male member's tip should protrude into at least 25% of the female member's length. Preferably, the male member's tip should protrude into greater than 50% of the female member's length. If the male member's tip should protrude into 100% of the female member's length, then the sprue will be "hollow" from tip to base, as per FIG. 2D. Referring back to FIG. 1 now, the present invention can be seen to allow the protruding height of the male member to vary as a % of sprue length (=to female member cavity length) from a modest "convex bump" all the way up until it touches the nozzle tip and therefore molds a sprue of what essentially would be a hollow cone shape at both upstream and downstream ends.

Furthermore, both the male and female members should be maintained at a temperature below the solidification temperature of the plastic, by being internally fitted with a mass transport cooling mechanism. The most common such embodiment would be the male and female member being internally cooled by a pressurized circulating liquid coolant. An alternative embodiment would be the male and female member being internally cooled by heat pipes using vapor/liquid phase change.

These last two features are believed to further set apart the present invention from the prior art sprues, since conceivably a conventional disk moldset which employs a centrally located ejector pin could try to push forward the tip of the pin so as to protrude into the female member cavity slightly and thereby form a sprue slightly hollow at its base. However, such a prior art embodiment would fall short of providing the same advantages of the present invention, as it would lack:

1. the substantial increase in inner and outer surface contact area, as provided when at least 25% of the sprue's length is "hollow", and 2. the internal mass transport type of cooling, since the conventional solid ejector pin can only remove heat by thermal conductivity down its length to a heat sink, and therefore would not be capable of the high heat-transfer rates of the present invention per unit of surface contact area.

Thus, such a prior art embodiment still would be comparable in neither surface contact area nor in heat-transfer rates per unit of surface contact area to the present invention.

Certain additional features in sprue bushing design are optional but desirable. One is to include a coldwell (18) in axial alignment with the nozzle tip, such that the first plastic injected from the nozzle tip will find its way into this deliberate concavity within the generally convex contour of the male member, so that it acts as a trap for any partically solidified or skinned material which may have been cooled while the mold was opened during ejection of the previous cycle disk and sprue. Use of such coldwells to trap cold slugs is well known in general moldmaking design art.

Another desirable optional feature for consideration in sprue design is to provide for a controlled degree of constrictiveness to create some melt shearing as the thermoplastic polymer is injected there between. These points of constriction would be represented by a narrowing of the separation distance between male and female members of the spure bushing assembly. Strategic placements of these "pinch points" or "lands" which create constrictiveness during injection fill deliberately create frictional shear heating between adjacent molecular layers of the molten polymer. This shear-induced frictional heating is well known to the art as viscous dissipation or "melt thinning" effects. Note that such a deliberate point of constriction is shown in FIG. 1, (20).

Another consideration in sprue design is the necessity to provide ample cohesive strength to the incompletely solidified sprue so as to not be torn apart by the forces applied thereto during ejection. For shortest molding cycle time, the sprue cooling must be shortened. Since the sprue is thicker than the disk (disk thickness is 1.2 mm by international standard), so when the disk is fully solidified and "shape stable" (i.e. cooled below the plastic's "Glass transition point" Tg), the sprue will still not be fully solidified at its thickest point. If too small a draft angle is used in the sprue design, then the retention forces wanting to hold onto the molded sprue on to the stationary half of the moldset will be too high (i.e., retention in the female member of the sprue bushing assembly). Therefore, the first step is to minimize such retention forces. However, there still will be a "tug of war" between the moving half of the mold and stationary half of the mold wanting to tear apart the partly-solidified "skinned" molded sprue while the mold is opening. Therefore, one has to look at the thickest point in the sprue, which with the conventional design will be at its diameter at the base or flange area. As the sprue is cooled and solidified from the outside in, this will be the "weak spot" which will determine the cohesive strength of the sprue during when these tearing forces are applied.

Figure 2C:
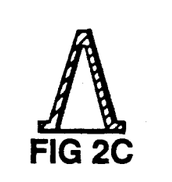
Figure 2D:
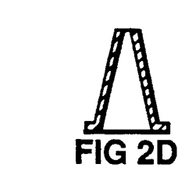

Now look again at FIG. 1D with Applicants' hollow sprue design. Its thickest spot instead is at the shoulder of the transition from a solid to a hollow sprue, and it would be proportionately much smaller "wall thickness" or diameter than a conventional sprue's base at the plane of the disk cavity. FIG. 2C also shows such a configuration of the present invention. FIG. 2D shows an alternative configuration, wherein a specially preferred embodiment using an in-the-mold traveling core pin to provide shut off of the mold at the nozzle tip also effectively eliminates the solid tip of the sprue bushing, thus making a hollow sprue of lower mass and potentially faster cooling time.

Note that in either embodiment, even without any axial motion to go from a first position of maximum separation distance to a second position of reduced separation distance, the open aperture of sprues of the present invention can be equal or greater than the conventional prior art sprues while still having far thinner wall thicknesses in the molded sprue itself. Alternatively, the wall thicknesses could be made equal by greatly enlarging the open aperture size represented by the cross-sectional area of the annular aperture formed by the hollow sprue, but there is practical limitations to such gains by increasing open aperture. Therefore in practice, the preferred designs of the present invention would probably modestly exceed the conventional sprue aperture cross-sectional areas when in a first position (i.e. provide some improvement in fill and pack), but mostly would be reflected in a major gain in sprue cooling capability.

Figure 3A:
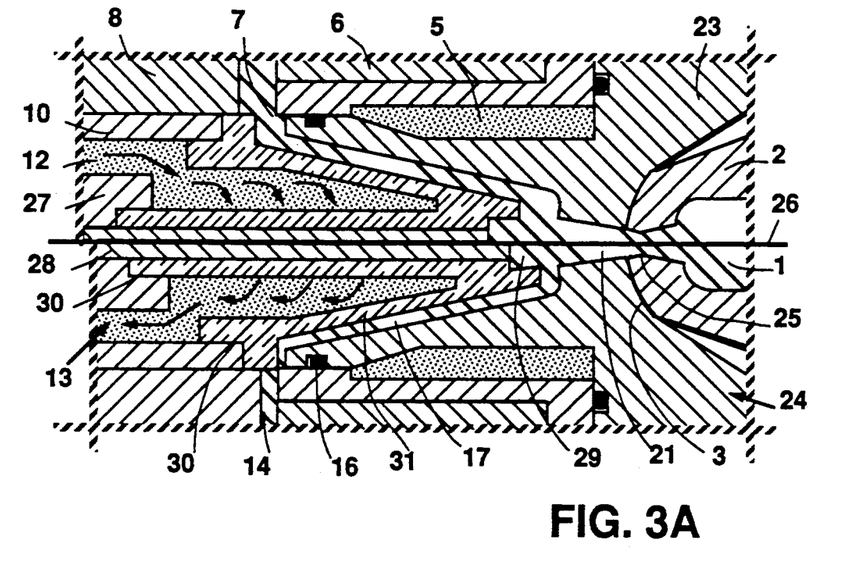
FIGS. 3A–3C are partial axial cross-sectional views with top and bottom split view to show a first position and second position before and after axial travel. Different self-degating ways of forming the centerhole is shown. A central ejector pin variation is also shown.

Looking now at FIG. 3, alternative means are shown to make the sprue bushing assembly go from the first position (shown in top portion of the split view) to the second position (shown in bottom portion of the split view). FIG. 3A shows this relative travel between the male and female members being driven by the compression stroke of an injection-compression molding process of the type well known to the art. Injection-compression molding processes feature a compression stroke which squeezes the injected melt (7) between opposing partforming surfaces ((6) and (8)) of a mold cavity, and is specifically desirable in the injection molding of thermoplastic optical lenses and disks. See Applicants' U.S. Pat. Nos. 4,828,769 and 4,900,242, incorporated herein by reference, showing specific optical disk molding embodiments. Note that in FIG. 3A's bottom portion of the split view (the mold at its "second position"), not only has the relative separation distance between male and female sprue bushing assembly members been reduced but also the relative separation distance of the opposing partforming surfaces of the disk mold cavity have been reduced, thus compressively packing the injected melt.

Figure 3B:
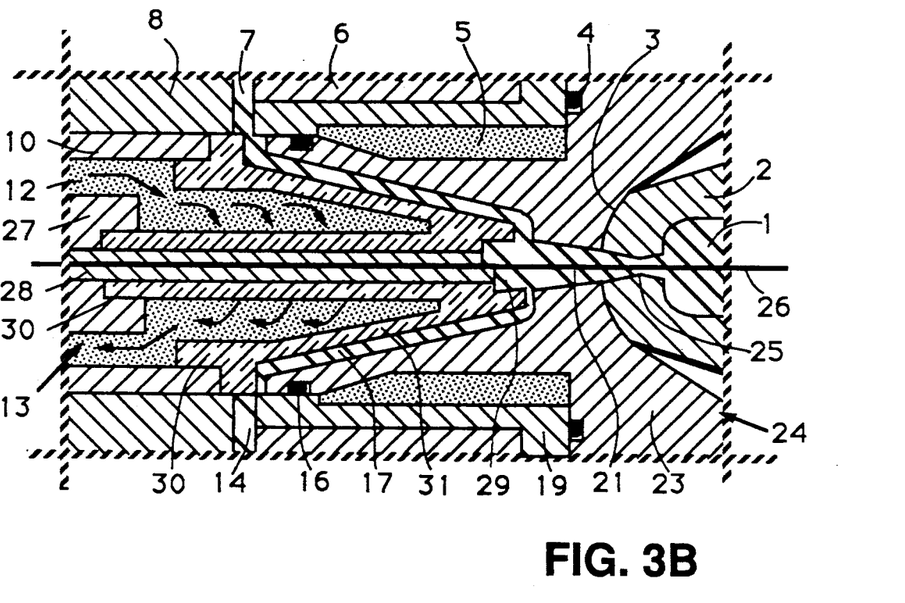

FIG. 3B shows in split top and bottom sectional views again axial travel from first to second position, this time driven as the male member's relative motion forward with respect to the adjacent movable half of the disk mold cavity (8). Specifically note that gate (7) has been sealed by such motion, thereby separating the sprue from the disk while both are still in a molten state. This is believed to be superior to punching the hole after solidification, as per FIG. 1C, since the cold-punching may create stresses in the plastic. Note that the separation distance between male and female has been reduced by the length of the axial travel by the male member between the first and second positions.

Figure 3C:
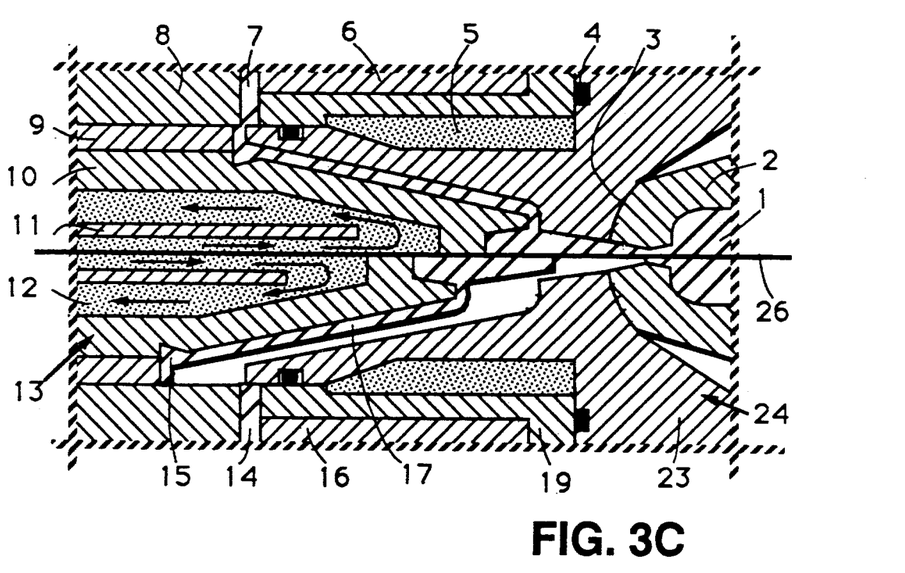

FIG. 3C shows a mechanically similar embodiment to FIG. 3B. However, after solidification has occurred but before the mold has opened, a rearward travel of the male member relative to the female member of the sprue bushing assembly causes the solidified plastic in the gate to tear away from the disk, thus providing another means for separating the sprue from the disk and to form the centerhole before the moldset is opened.

In each of FIGS. 3A–3B, the monolithic male member (10) of FIG. 1 has now been replaced by a subassembly (13) wherein a co-axially aligned central ejector pin (28) has been slidably mounted within male member (10). The I.D. and O.D. of male member (10) in turn is joined (at solder bonds (30)) to support shaft (27) and support sleeve (9) respectively, thus defining an enclosed annular internal space for circulation of liquid coolant therein as shown by the directional flow pattern arrows. Note when the moldset is in its first and second positions, the ejector pin (28) is retracted to form a coldwell (18), but when the moldset is opened, the pin (28) is driven forward to eject the molded sprue (21) off the male member (10). Such motion can be conventionally supplied by mechanical tie-in to the injection molding machine's ejector or core function, or alternatively independently driven by springs or hydraulic or pneumatic cylinders mounted within the moldset itself. Any such means may be chosen, so as to slidably advance or retract the pin while holding the male member stationary.

Looking now at FIG. 4, optional but preferred embodiments are shown which are able to perform all of the previously mentioned desired functions of the sprue but in addition are able to use the axial motion from first to second positions within the disk moldset to substantially open and close mechanically the nozzle tip of the injection molding machine. This is typically desired after the mold is suitably filled but the gate and/or sprue tip is not yet solidified. Ordinarily, such screw plastication operations could only commence after the nozzle tip is substantially solidified. Otherwise, undesirable loss of packing pressure and back flow of still-molten thermoplastic could occur, resulting in detrimental disk molding quality. Running conventional "sprue break" as an alternative (as shown in FIG. 1C) can also be a problem because drooling or sprue stringing can occur. Alternatively, mechanically complex and expensive shutoff nozzles can be employed but these also undesirably split the melt stream at their support spiders during the injection flow.

Figure 4A:
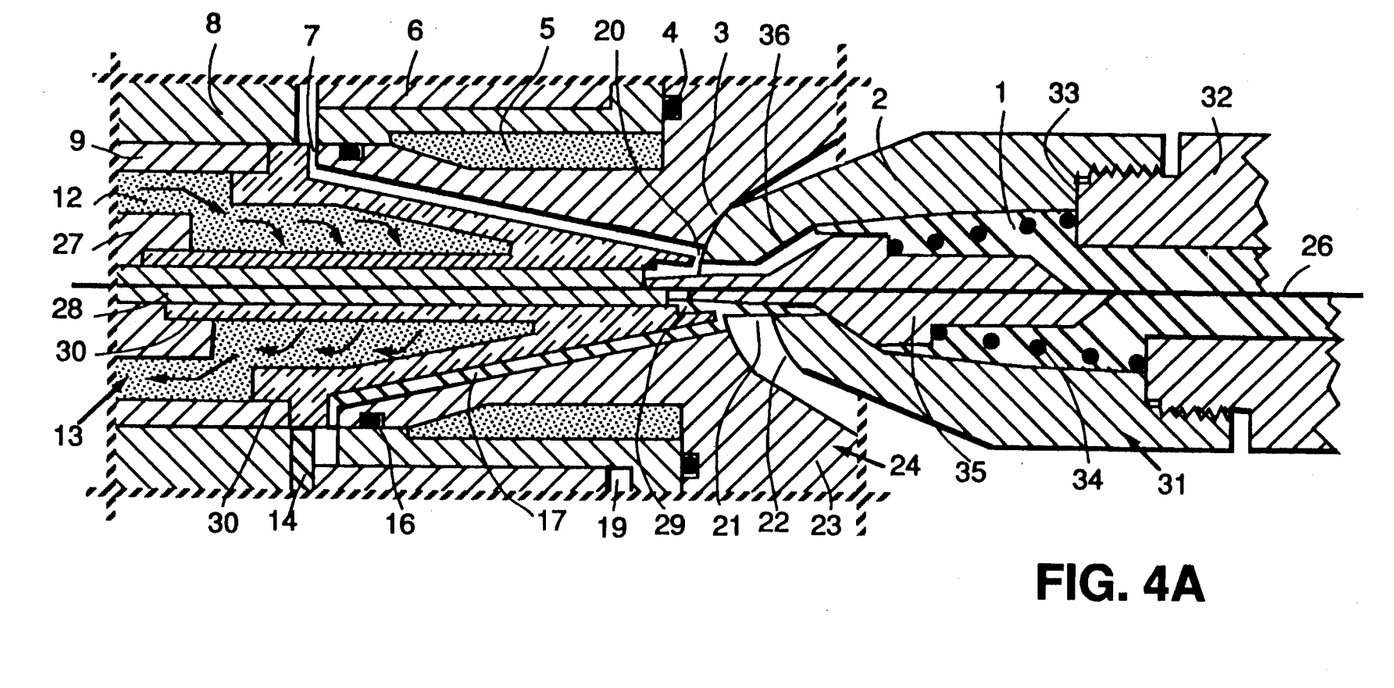
FIGS. 4A–4B is a partial axial cross-section view with top and bottom split view to show a first position and second position before and after axial travel, showing nozzle shutoff features of the mold.

FIG. 4A shows the present invention with a two piece male member comprising a centrally located, controllably traveling pin (28) housed within male member (10) in a similar subassembly (13) described and shown in FIG. 3. As shown in FIG. 4A top and bottom views, the pin (28) and male member moved together (no relative change of position between them). Alternatively, but not shown, pin (28) is capable of axial travel forward and back relative to male member (10) under driving forces mentioned previously, so as to be alternatively engaged and disengaged with floating nozzle shutoff pin (35).

The external portion of nozzle assembly (31) is made up by nozzle adapter (32), mounted onto the downstream end of the barrel (not shown) of the injection molding machine which feeds it pressurized melt (1) when injection fill is desired and nozzle tip (2) threaded onto adapter (32) at seal area (33). Substantially centered therein and co-axially aligned is floating shutoff pin (35) which is biased forward by coil spring (34) (shown in helical cross-section), such that it seats forward against the mating contour inside surface (36) of nozzle tip (2) to shut off any flow of melt (1) into the moldset whenever it is disengaged from pin (28) (as shown in bottom split view of FIG. 4A) but that when pin (28) is forward to engage it (as shown in top split view of FIG. 4A), shutoff pin (35) is deflected rearward, overcoming spring (34) force, to create an open aperture through which melt (1) can flow into the moldset.

Figure 4B:
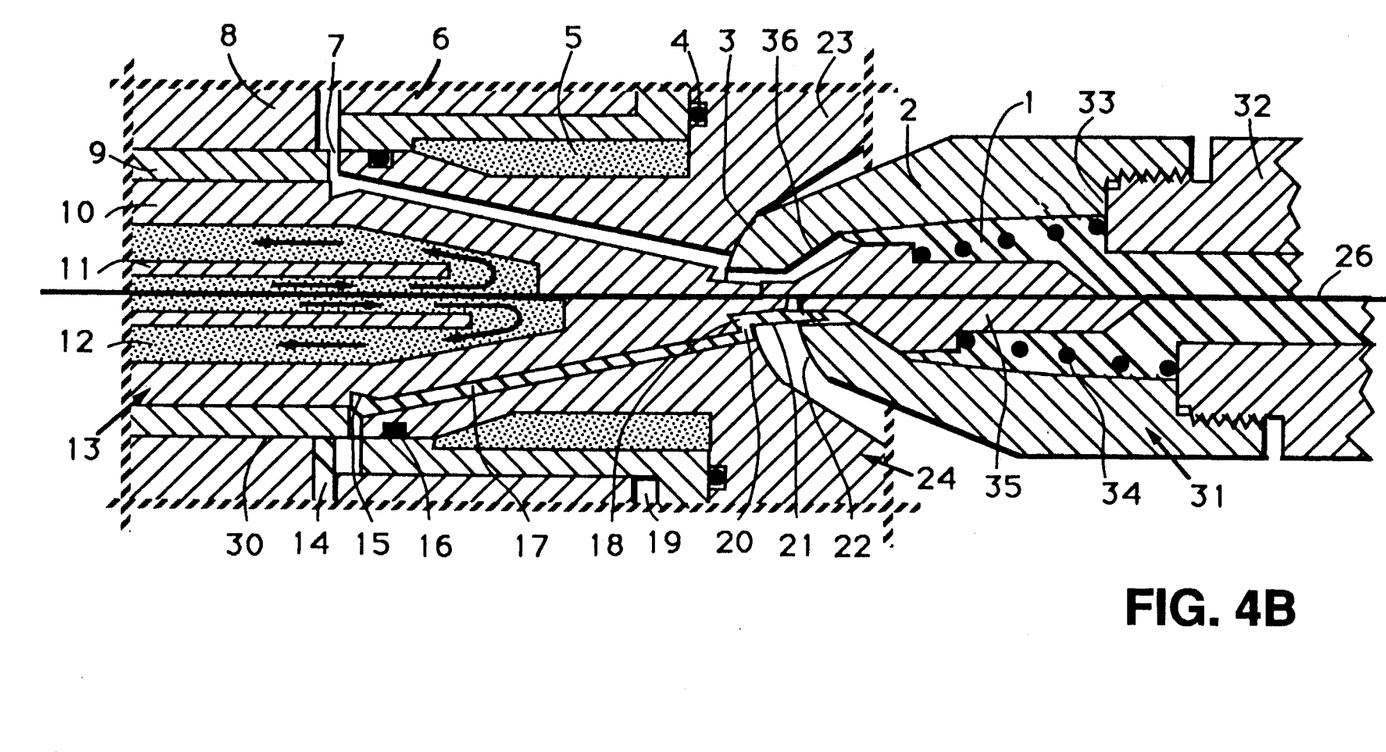

In FIG. 4B, a one-piece design or monolithic male member construction is shown in split view, with the top split view showing the moldset in first position, with the nozzle tip open as would be the case during the injection and fill and pack portion of the molding cycle. Then, after all desired plastic flow is to be halted, forward travel of the monolithic male member is made to a second position but nozzle assembly (31) is further retracted a greater distance (by "sprue break" of the machine, for example) such that the male member (10) no longer contacts shutoff pin (35) and therefore spring (34) forces it to seat against tip (2), at which point shutoff substantially seals the nozzle tip opening against further plastic flow in or out.

We claim:

1. A method of injection molding plastic optical disks in a moldset maintained in fluid communication through a nozzle tip with an injection molding machine at least while plastic melt flow into the moldset is desired, the moldset containing a sprue bushing assembly having a female member and a male member co-axially aligned with the nozzle tip so as to form a melt passageway from the nozzle tip on an upstream end to an annular gate to a disk mold cavity on a downstream end such that the melt passageway between its ends defines a length and a shape of a sprue to be formed between the nozzle tip on the upstream end to the annular gate to a disk mold cavity on the downstream end, the male member having a spreader die contour of a generally conically-tipped torpedo-shape, the male member protruding substantially into the female member cavity's length and the male member being separated from the female member cavity in a first position to form at least substantially upstream from the gate an annular open aperture between the male and female members wherein a hollow sprue may be molded, the hollow sprue having both inside and outside surfaces, the male and female members being capable of axial motion therebetween to a second position of the moldset wherein the male and female members are less separated than in the first position, and at least the male member being maintained at a temperature below the solidification temperature of the plastic by a mass transport cooling mechanism, comprising the steps of:

(a) injecting plastic melt into the moldset in the first position to form the molten hollow sprue and disk therein;

(b) urging together axially the male and female members while the hollow sprue is still molten until the second position of the moldset is reached, wherein the male and female members are less separated than in the first position, (c) cooling the molten hollow sprue by concurrent contact on the inside surface with the male member and contact on the outside surface with the female member, while concurrently the molten disk is also being cooled to below its solidification temperature;

(d) ejecting the molded hollow sprue and solidified disk out of the moldset.

2. A method of claim 1 wherein the urging together axially of the male and female members while the hollow sprue is still molten until the second position of the moldset is reached also thereby shuts the gate and thus separates the disk from the sprue before ejecting the molded hollow sprue and solidified disk out of the moldset.

3. A method of claim 1 wherein urging together axially the male and female members while the hollow sprue is still molten until the second position of the moldset is reached also thereby reduces the gate to a thin film which may then be torn by axial travel of the male member to thus separate the disk from the sprue.

4. A method of claim 1 wherein the urging together axially of the male and female members while the hollow sprue is still molten is driven by a compression stroke of an injection-compression molding process.

5. A method of claim 1 wherein the male member slidably houses an ejector pin co-axially aligned with the nozzle tip, and after the moldset is opened the ejector pin is driven forward to separate the sprue from the male member.

6. A method of claim 1 wherein an ejector sleeve is slidably mounted concentrically on the outside of the male member, and after ejecting the molded hollow sprue and solidified disk out of the moldset, the ejector sleeve is driven forward to separate the sprue from the male member.

7. A method of claim 1 wherein the male member slidably houses an ejector pin co-axially aligned with the nozzle tip with a floating spring-biased shutoff pin contained within the nozzle tip, and after the moldset is closed the ejector pin is driven forward to engage and deflect rearward the shutoff pin so as to open the nozzle for the plastic melt to flow into the moldset, and after ejecting the molded hollow sprue and solidified disk out of the moldset, the ejector pin is disengaged from the shutoff pin so the spring forces forward the shutoff pin to close the nozzle, thereby stopping the plastic melt from flowing into the moldset.

8. A method of claim 1 wherein a monolithic male member has a forward tip co-axially aligned with the nozzle tip with a floating spring-biased shutoff pin contained within the nozzle tip, and after the moldset is closed the forward tip is driven forward to engage and deflect rearward the shutoff pin so as to open the nozzle for the plastic melt to flow into the moldset, and after ejecting the molded hollow sprue and solidified disk out of the moldset, the forward tip is disengaged from the shutoff pin so the spring forces forward the shutoff pin to close the nozzle, thereby stopping the plastic melt from flowing into the moldset.

9. A method of claim 1 wherein at least the male member is internally cooled by a pressurized circulating liquid coolant.

10. A method of claim 1 wherein the male member is internally cooled by heat pipes using vapor/liquid phase change.

11. A method of claim 1 wherein both the male and the female members are internally cooled by a pressurized circulating liquid coolant.

12. A sprue bushing assembly apparatus for injection molding plastic optical disks within a moldset having a stationary moldhalf and a movable moldhalf, the moldset being maintained in fluid communication through a nozzle tip with an injection molding machine at least while plastic melt flow into the moldset is desired, during which time in each molding cycle the moldset is maintained in a first position, the sprue bushing assembly comprising:

(a) a female member housed within the stationary moldhalf, the female member being co-axially aligned with the nozzle tip so as to form a melt passageway from the nozzle tip on an upstream end to an annular gate to a disk mold cavity on a downstream end such that the melt passageway between its ends defines a length and a shape of a sprue to be formed between the nozzle tip on the upstream end to the annular gate to the disk mold cavity on the downstream end, the female member having a conical cavity of sufficiently large draft and length at the downstream end in the first position of the moldset to contain therein a co-axially aligned protruding male member;

(b) the male member opposing the female member, the male member being housed within the movable moldhalf, the male member being co-axially aligned with the nozzle tip and having a spreader die contour of a generally conically-tipped torpedo-shape protruding substantially into the female member, and also protruding through a plane in which lie the annular gate and the disk mold cavity, when the moldset is in the first position, the male member being separated from the female member cavity in the first position to form at least substantially upstream from the gate an annular open aperture between the male and female members wherein a hollow sprue may be molded, the hollow sprue having both inside and outside surfaces in contact with the male and female members respectively, such that a contact area of the inside and outside surfaces summed together substantially exceed all surface contact area of a solid conical sprue of an equal length; and (c) a mass transport cooling mechanism fitted internally into at least the male member capable of being maintained at a temperature below the solidification temperature of the plastic.

13. An apparatus of claim 12 further comprising: at least one of the opposing male and female members being slidably mounted for axial travel relative to the other member; and (d) means for urging together axially the male and female members while the hollow sprue is still molten until a second position of the moldset is reached, wherein the male and female members are less separated than in the first position.

14. An apparatus of claim 13 further comprising:

(e) means for ejecting the molded hollow sprue and solidified disk out of the moldset.

15. An apparatus of claim 14 further comprising:

(f) the means for urging together axially the male and female members while the hollow sprue is still molten until a second position of the moldset is reached also thereby shuts the gate and thus separates the disk from the sprue before the moldset is opened.

16. An apparatus of claim 12 wherein the male member opposing the female member is co-axially aligned with the nozzle tip and has a spreader die contour of a generally conically-tipped torpedo-shape protruding substantially into the female member when the moldset is in the first the female member's length while in a second position of the moldset.

17. An apparatus of claim 12 wherein the male member opposing the female member is co-axially aligned with the nozzle tip and has a spreader die contour of a generally conically-tipped torpedo-shape protruding substantially into the female member when the moldset is in the first position, and the male member protrudes axially into more than 50% of the females' length while in a second position of the moldset.

18. An apparatus of claim 12 wherein the male member opposing the female member is co-axially aligned with the nozzle tip and has a spreader die contour of a generally conically-tipped torpedo-shape protruding substantially into the female member when the moldset is in the first position, and the male member protrudes axially into 100% of the females' length while in a second position of the moldset, thereby forming a sprue hollow from base to tip.

19. An apparatus of claim 13 wherein the means for urging together axially of the male and female members while the hollow sprue is still molten are also the means for concurrently driving a compression stroke of an injection -compression molding process.

20. An apparatus of claim 14 wherein (e) the means for ejecting the molded hollow sprue and solidified disk out of the moldset further comprises an ejector pin slidably housed within the male member and co-axially aligned with the nozzle tip, and after the moldset is opened the ejector pin is driven forward to separate the sprue from the male member.

21. An apparatus of claim 14 wherein (e) the means for ejecting the molded hollow sprue and solidified disk out of the moldset further comprises an ejector sleeve being slidably mounted concentrically on the outside of the male member, and after the moldset is opened the ejector sleeve is driven forward to separate the sprue from the male member.

22. An apparatus of claim 13 wherein the male member slidably houses an ejector pin co-axially aligned with the nozzle tip with a floating spring-biased shutoff pin contained therein, and after the moldset is closed the ejector pin is driven forward to engage and deflect rearward the shutoff pin so as to open the nozzle tip for the plastic melt to flow into the moldset, and after the moldset is opened the ejector pin is disengaged from the shutoff pin so the spring forces forward the shutoff pin to close the nozzle, thereby stopping the plastic melt from flowing into the moldset.

23. An apparatus of claim 13 wherein the male member is monolithic and has a forward tip co-axially aligned with the nozzle tip with a floating spring-biased shutoff pin contained therein, and after the moldset is closed the forward tip is driven forward to engage and deflect rearward the shutoff pin so as to open the nozzle tip for the plastic melt to flow into the moldset, and after the moldset is opened the forward tip is disengaged from the shutoff pin so the spring forces forward the shutoff pin to close the nozzle, thereby stopping the plastic melt from flowing into the moldset.

24. An apparatus of claim 12 wherein the mass transport cooling mechanism fitted internally into at least the male member capable of being maintained at a temperature below the solidification temperature of the plastic is at least the male member internally cooled by a pressurized circulating liquid coolant.

25. An apparatus of claim 12 wherein the mass transport cooling mechanism fitted internally into at least the male member capable of being maintained at a temperature below the solidification temperature of the plastic is at least the male member internally cooled by heat pipes using vapor/liquid phase change.

26. An apparatus of claim 12 wherein the mass transport cooling mechanism fitted internally into at least the male member capable of being maintained at a temperature below the solidification temperature of the plastic is both the male and the female members internally cooled by a pressurized circulating liquid coolant.

27. An apparatus of claim 12 wherein the male and female member are aligned so as to form at least one constrictive land near the tip of the hollow sprue, so as to prevent unmelt and cold slugs from entering into the disk mold cavity.

28. A method of injection molding plastic optical disks in a moldset, the moldset having a stationary moldhalf and a movable moldhalf, the moldset being maintained in fluid communication through a nozzle tip with an injection molding machine at least while plastic melt flow into the moldset is desired, the moldset containing a sprue bushing assembly having a female member housed within the stationary moldhalf and a male member housed within the movable moldhalf, the male member opposing the female member such that both members are co-axially aligned with the nozzle tip and also the male member is protruding through a plane in which lie the annular gate and the disk mold cavity when the moldset is in a first position, the male member being separated from the female member cavity in the first position to form at least substantially upstream from the gate an annular open aperture between the male and female members wherein a hollow sprue may be molded, the hollow sprue having both inside and outside surfaces in contact with the male and female members respectively, such that a contact area of the inside and outside surfaces summed together substantially exceed all surface contact area of a solid conical sprue of an equal length, and co-axially aligned with the nozzle tip so as to form a melt passageway therebetween from the nozzle tip on an upstream end to an annular gate to a disk mold cavity on a downstream end such that the melt passageway between its ends defines a length and a shape of a sprue to be formed between the nozzle tip on the upstream end to the annular gate to a disk mold cavity on the downstream end, the male member having a spreader die contour of a generally conically-tipped torpedo-shape, the male member protruding through a plane in which lie the annular gate and the disk mold cavity, and substantially into the female member cavity's length and the male member being separated from the female member cavity in a first position to form at least substantially upstream from the gate an annular open aperture between the male and female members wherein a hollow sprue may be molded, the hollow sprue having both inside and outside surfaces, the male and female members being capable of axial motion to a second position of the moldset wherein the male and female members are separated by at least a same distance as in the first position but the annular gate is now closed, and at least the male member being maintained at a temperature below the solidification temperature of the plastic by a mass transport cooling mechanism, comprising the steps of:
(a) injecting plastic melt into the moldset in the first position to form the molten hollow sprue and disk therein;
(b) cooling the molten hollow sprue by concurrent contact on the inside surface with the male member and contact on the outside surface with the female member, while concurrently the molten disk is also being cooled to below its solidification temperature;
(c) urging axially both the male and female members after the hollow sprue is substantially solidified, until a second position of the moldset is reached, wherein the male and female members are separated by at least the same distance as in the first position, and the hollow sprue is now separated from the disk before the moldset is opened;
(d) ejecting the molded hollow sprue and solidified disk out of the moldset.

29. A method of claim 28 wherein at least the male member is internally cooled by a pressurized circulating liquid coolant.

30. A method of claim 28 wherein the male member is internally cooled by heat pipes using vapor/liquid phase change.

31. A method of claim 28 wherein both the male and the female members are internally cooled by a pressurized circulating liquid coolant.

* * * * *